United States Patent [19]

Hanson

[11] 4,182,187
[45] Jan. 8, 1980

[54] FORCE BALANCING ASSEMBLY FOR TRANSDUCERS

[75] Inventor: Richard A. Hanson, Woodinville, Wash.

[73] Assignee: Sundstrand Data Control, Inc., Redmond, Wash.

[21] Appl. No.: 899,607

[22] Filed: Apr. 24, 1978

[51] Int. Cl.² .............................................. G01P 15/08
[52] U.S. Cl. .................................... 73/497; 73/517 B; 177/210 C
[58] Field of Search ................. 73/517 B, 497, 516 R; 318/634, 651; 177/210 EM, 210 C, 226

[56] References Cited

U.S. PATENT DOCUMENTS

| | | | |
|---|---|---|---|
| 2,697,594 | 12/1954 | Stanton | 73/517 B |
| 3,176,521 | 4/1965 | Clark | 73/517 B |
| 3,209,601 | 10/1965 | Stiles | 73/517 B |
| 3,331,253 | 7/1967 | Morris | 73/517 B |
| 3,702,073 | 11/1972 | Jacobs | 73/517 B |

Primary Examiner—James J. Gill
Attorney, Agent, or Firm—Ted E. Killingsworth; Michael B. McMurry; William R. Peoples

[57] ABSTRACT

In order to reduce bias errors resulting from mounting of a force restoring coil assembly element of a force balancing transducer, the force coil assembly is suspended by means of one or more hinges from a force sensing movable member, which includes position pick-off means, that in turn is connected by hinging means to a support member. The effects of strain may further be reduced by locating the first hinges essentially along the axis of the centroid of the pick-off means.

22 Claims, 8 Drawing Figures

FORCE BALANCING ASSEMBLY FOR TRANSDUCERS

BACKGROUND OF THE INVENTION

The invention relates to the field of force balancing transducers such as accelerometers and more particularly to the structure of force balancing assemblies used within force sensing instruments.

In prior art instruments, an example of which is the type of accelerometer disclosed in Jacobs, U.S. Pat. No. 3,702,073, assigned to the assignee of this application, the proof mass and force balancing assembly includes a support ring between an upper and lower magnet assembly of the accelerometer and a seismic element, that includes a force restoring coil and bobbin assembly and pick-off capacitor plates, connected by means of one or more flexure-type hinges to the support ring. In this particular instrument the proof mass assembly including the support ring and flexures are configured out of a unitary piece of fused quartz.

Servoed angular accelerometers, servoed pressure transducers, and instruments using search coils, sensing magnetic fields, are other typical examples of instruments using force balancing assemblies.

One of the objectives in designing force balancing assemblies such as the proof mass and force coil assembly shown in U.S. Pat. No. 3,702,073 is to minimize the effect of stress in flexure elements, which in that device connect a seismic element to a support ring, from stress sources, including stresses resulting from a force coil mounting, that can result in strain in the flexures. The strain in the flexures can result in significant bias errors in a servoed instrument. In this servoed accelerometer the pick-off means includes elements on the seismic element force balancing assembly which are used to produce a signal indicating the position of the assembly within the instrument that in turn is used to generate a current in the force balancing coil to restore the seismic element to a zero acceleration position within the instrument. Strain within the seismic element can produce a position signal error. The servo will attempt to zero the position signal error generated, by moving the seismic element, producing a stress or a strain in the flexures in the process. The resulting stress in the flexures produces a moment force which the current in the force coil must balance. The current thus produced in the force coil represents an undesired bias in the current output signal.

As a practical matter a stress free mounting of the force coil on the force balancing assembly is usually not achievable, especially where the force sensing element is made out of a material such as quartz. Quartz has a very low temperature coefficient of expansion compared to that of a force coil which normally is composed of insulated copper wire. Also the adhesive materials used for attaching a coil or bobbin to the force sensing element typically have high temperature coefficients as compared to the materials typically used for force sensing elements of which quartz is one example. A bobbin to form an assembly on which the coil is wound is sometimes used, but does not eliminate the effect of differential temperature expansion even with a match of bobbin and mounting surface temperature coefficients which in any case is usually not practical for other design or fabrication considerations. As a result, there will almost always be some temperature induced stress and strain in the force sensing element through some temperature range which in turn can result in undesired bias errors in the instrument as described above.

SUMMARY OF THE INVENTION

It is therefore an object of the invention to provide a force balancing assembly for use in force sensitive transducers including a search or force restoring assembly connected by means of one or more hinges to a force sensing element incorporating a pick-off means which in turn is connected to a support member by means of a second hinge.

It is another object of the invention to provide a force balancing assembly for use in force sensitive instruments wherein a search or force restoring coil or coil assembly is connected by means of one or more hinges to a force sensing member and the hinge is located generally along an axis of the centroid of the pick-off means and wherein the force sensing member is connected by a second hinge to a suppor member.

It is a further object of the invention to provide an assembly for use in a force sensitive transducer wherein the force balancing assembly includes a force restoring coil or coil assembly supported by means of a flexure-type hinge within a movable element having a force sensing member having pick-off means and wherein the movable element is connected by means of a second flexure-type hinge to a support member, wherein the first hinge is located on the opposite side of the force sensing member at a maximum separation from the second hinge.

DETAILED DESCRIPTION OF THE INVENTION

Figure 1:
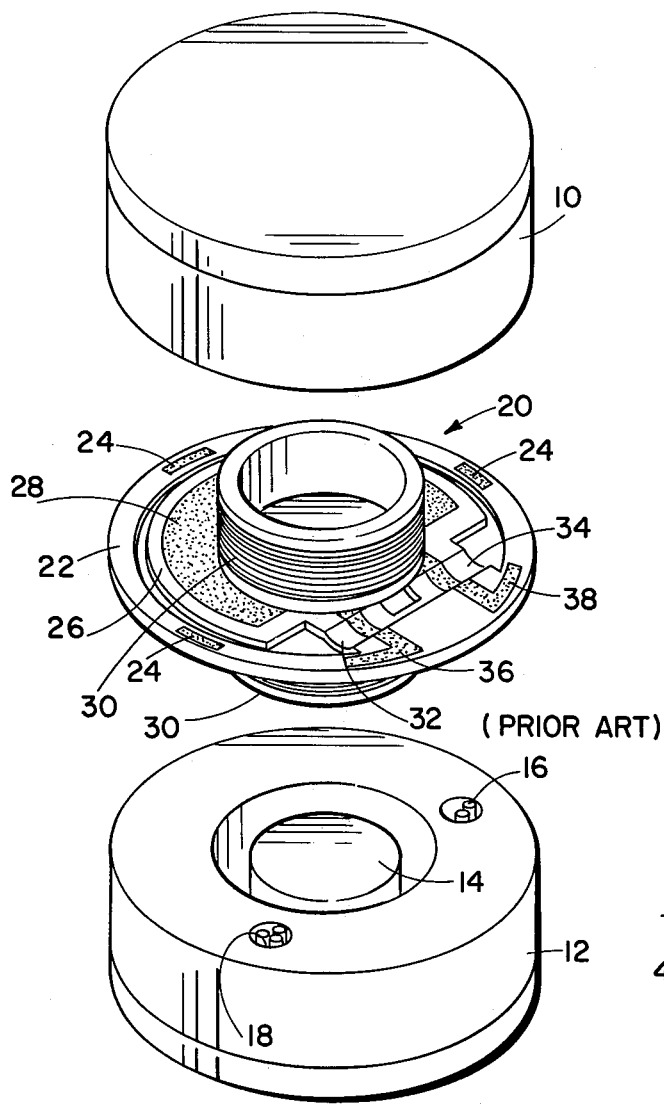
FIG. 1 is an exploded view of an accelerometer including a prior art proof mass assembly.

FIG. 1 illustrates, as an example of a force balancing assembly of the prior art type, an accelerometer which is disclosed in detail in the aforementioned U.S. Pat. No. 3,702,073. This accelerometer includes an upper magnet structure 10 and a lower magnet structure 12. Included in each of the upper 10 and lower 12 magnet structures are permanent magnets as illustrated by a magnet 14 shown in the lower magnet structure 12. In addition the lower magnet structure includes lead support posts as illustrated at 16 and 18. Also shown in FIG. 1 is a prior art force balancing assembly of the proof mass type generally indicated at 20. Supporting the proof mass assembly is an outer support ring 22 which is supported between the upper magnet structure 10 and the lower magnet structure 12 by a series of mounting pads 24. Included in the proof mass assembly 20 is an inner movable element 26 which in accelerometers of this type is normally termed a flapper or a reed extending radially inwardly from the support ring 22. Deposited on each side of the flapper 26 is an electrically conductive material 28 that serves as a capacitive pick-off plate. The capacitive pick-off plates 28 on the upper and lower surfaces of the flapper 26 cooperate with the inner surfaces of the upper and lower magnetic structures 10 and 12 to provide a capacitive pick-off system.

Mounted on either side of the flapper 26 is a force restoring coil 30 wound on a pair of bobbins 31. As is well understood in the servoed instrument art, the force restoring or torquer coils 30 cooperate with the permanent magnets 14 to retain the flapper 26 within a predetermined position with respect to the supporting 22.

The flapper element 26 including the force coils 30 is connected to the support ring 22 by means of a pair of flexure hinge elements 32 and 34. The flexures 32 and 34 permit the seismic movable element 26 and the coils 30 to rotate in a pendulous manner with respect to the support ring 22. Also deposited on the support ring 22 and flexures 32 and 34 in this particular example of an accelerometer are thin film pick-off leads 36 and 38 which provide electrical connections to the capacitor plates 28 and the force coils 30.

As previously discussed the securing of the force restoring coils 30 to the flapper 26 can lead to stress and as a result strain effects can be transmitted to the flexures 32 and 34. Any resulting strain in the flexures 32 and 34 will require sufficient current to be transmitted through the force coils as a result of the servo action of the accelerometer to introduce a significant bias into the signal output of the accelerometer.

Illustrated in FIGS. 2–8 are various arrangements of force balancing assemblies as designed to overcome the effects of strain in the assembly as described above. Although the force balancing assemblies of FIGS. 2–6 are generally circular in shape, it should be understood that the principles described herein for reducing the effects of stress and strain would apply equally well to noncircular configurations. These principles apply to transducers in general as well as accelerometers. The reference numerals 22, 28, 30, 32 and 34 in FIGS. 2–6 correspond to similar elements as described in connection with FIG. 1.

Figure 2:
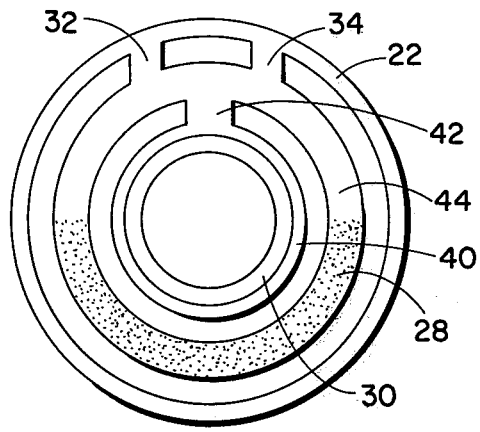
FIG. 2 is a top view of a first force balancing assembly illustrating a first embodiment of the invention.

The first embodiment of the invention, illustrated in FIG. 2, includes a separate inner support member 40 for supporting the force coils 30. The force coil support member 40 is connected by means of a flexure-type hinge 42 to a concentric intermediate force responsive movable member 44 that includes in this embodiment capacitive plates 28 deposited thereon as pick-off elements. As in the proof mass assembly of FIG. 1 the movable member 44 is connected to the support ring 22 by means of a pair of flexures 32 and 34. By placing the coil 30 on a separate member 40 which is connected to the member 44 by the flexure hinge 42, strains in the proof mass assembly caused by the force coil 30 tend to be isolated from the flexures 32 and 34 thereby tending to reduce bias errors in the instrument. Although the force coil 30 can move to a limited extent with respect to the member 44 and pick-off plates 28, the flexure 42 is effective to transmit the restoring force from the coil 30 to the member 44.

Figure 3:
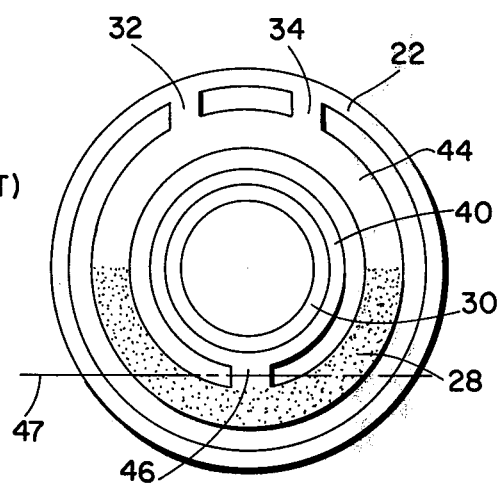
FIG. 3 is a top view of a second force balancing assembly illustrating a second embodiment of the invention.

A preferred embodiment of the invention which is suitable for use with the accelerometer of FIG. 1 is illustrated by the proof mass assembly of FIG. 3. As in the assembly of FIG. 2, the force coils 30 are placed on a separate inner support member 40. The support coil 30 and support 40 are then isolated from the concentric intermediate flapper element 44 by means of a flexure hinge 46. This flexure is similar to the flexure 42 of FIG. 2 except that it is located on the opposite side of the flapper member from the flexures 32 and 34. This serves to further isolate stress forces from the force coil 30 and its mounting structure 40 from the flexures 32 and 34. In the embodiment of FIG. 3, an axis 47 of the centroid of the pick-off plates 28 intersects the flexure 46. By locating the flexure on the axis 47 any strain coupled through the flexure 46 will result in less motion of the pick-off centroid significantly reducing pick-off error signals.

Figure 4:
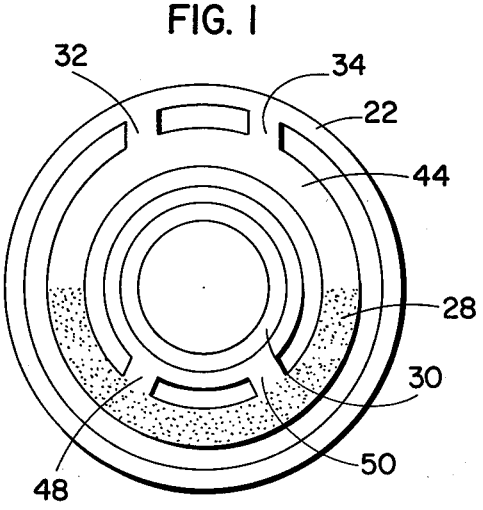
FIG. 4 is a top view of a third force balancing assembly illustrating a third embodiment of the invention.

Another embodiment of the invention is illustrated in FIG. 4. In this assembly the force coil 30 and inner force coil support member 40 are connected to the concentric intermediate force sensing movable member 44 by means of two flexure members 48 and 50. It may be desirable to use more than one flexure or hinge to support the movable member 44 as illustrated in FIG. 4. By locating flexures, such as flexures 48 and 50 of FIG. 4 in various locations, it is possible to maintain flexure stiffness at desired levels thereby minimizing strain coupling while maximizing force coupling.

Figure 5:
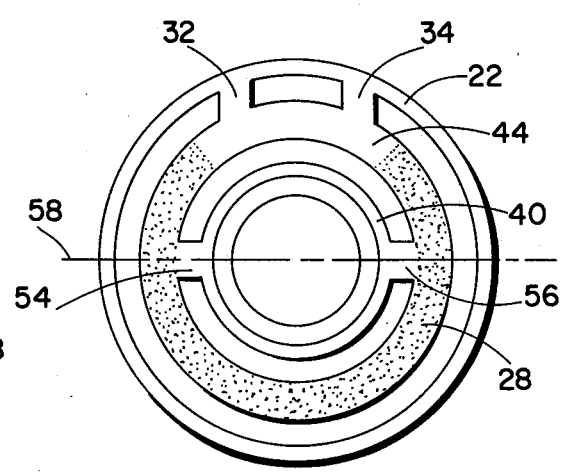
FIG. 5 is a top view of a fourth force balancing assembly illustrating a fourth embodiment of the invention.

A forth embodiment of the invention is shown in FIG. 5 wherein the force coils 30 and inner support member 40 are connected to the concentric intermediate movable member 44 means of a pair of torsional hinge members 54 and 56 which permit movement of inner support member 40 about axis 58.

In each of the embodiments of the proof mass assembly illustrated in FIGS. 2–6, it is considered preferable to configure the support ring, the pick-off support member 44 and the force coil support member 40 as well as the flexures 42, 46, 48, 50 and the torsion members 54 and 56 out of a unitary piece of material such as fused quartz.

Figure 6:
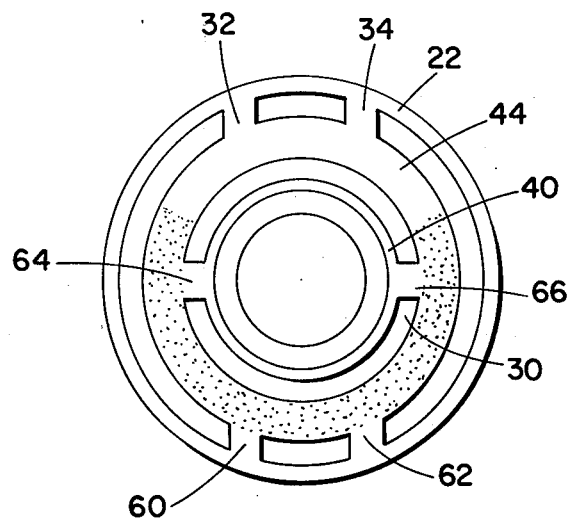
FIG. 6 is a top view of a fifth force balancing assembly illustrating a fifth embodiment of the invention.

A fifth embodiment of the invention is illustrated in FIG. 6 which provides for linear motion of the inermediate force sensing movable member 44 instead of the rotational or pendulous motion of the movable members 44 as shown in the force balancing assemblies of FIGS. 2–5. Flexure hinges 32 and 34 cooperate with another pair of flexure hinges 60 and 62 to permit the movable member to move in a linear direction perpendicular to the plane of the member 44. As in the force balancing assembly of FIG. 5 the concentric inner support member 40 is supported by a pair of hinges 64 and 66.

The concept of isolating the force restoring portion of a force balancing assembly from the position sensing position of the structure can be applied to a wide variety of force balancing transducer structures. Other examples of force balancing assemblies are illustrated in FIGS. 7 and 8.

Figure 7:
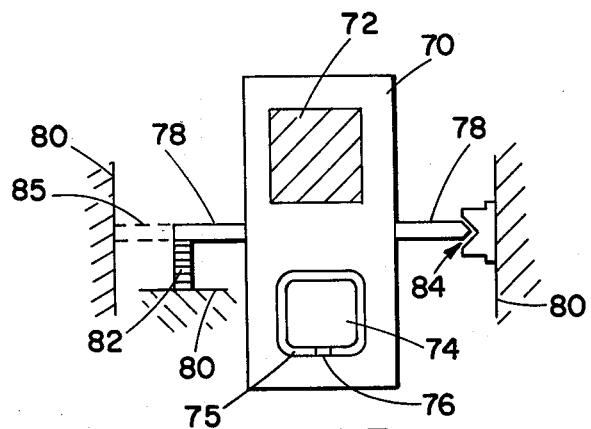
FIG. 7 is a top view of a sixth force balancing assembly illustrating a sixth embodiment of the invention.

For example, in FIG. 7 a force sensing movable assembly 70 configured as a beam includes a pick-off element 72 at one end and a force restoring coil assembly 74 located at the other end. The force restoring coil 74 is centrally located relative to an aperture 75 in the beam and in turn is isolated, in the embodiment shown, from the beam by means of a flexure 76. As discussed in connection with the assemblies of FIGS. 2–6 the coil 74 can be connected to the movable member or beam 70 by a number of different hinge arrangements. In the force balance assembly of FIG. 7 the beam 70 has an axle 78 around which it is free to rotate. Alternative means for securing the axle 78 and hence the beam 70 to a support member are shown in FIG. 7. The left-hand portion of the axle 78 is shown connected to the support member by means of a flexure 82 and the right-hand portion by an second alternate wherein the beam is connected to the support member 80 by means of a pivot pin arrangement 84. The left-hand portion of axle 78 is also shown supportable in the alternative by a torsional member 85 as indicated by dashed lines. Thus FIG. 7 illustrates three different hinge arrangements for supporting the movable member 70 as well as illustrating an embodiment of the invention wherein the pick-off area 72 is located on the opposite end of the movable member 70 from the force restoring coil on opposite sides of axis 78.

Figure 8:
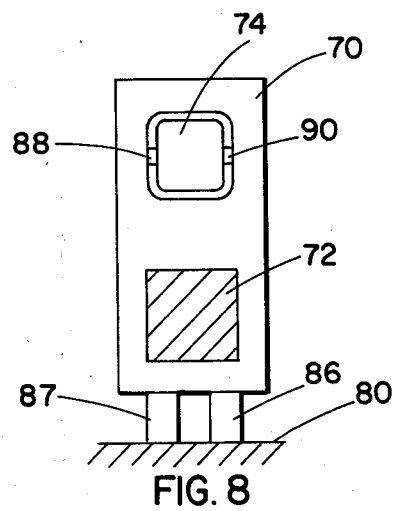
FIG. 8 is a top view of a seventh force balancing assembly illustrating a seventh embodiment of the invention.

The force balancing assembly of FIG. 8 is generally similar to the assembly of FIG. 7 except that the movable member or beam 70 is connected to the support member 80 by means of a pair of flexures 86 and 87. It will be understood that the hinge arrangement of flexures 86 and 87 can also be implemented by a pivot pin arrangement. The force coil 74 is suspended from the beam 70 by means of a pair of flexures 88 and 90 in this particular embodiment although other flexure or hinge arrangements can be used as well.

It will be appreciated that even though the force balancing assemblies shown in FIGS. 7 and 8 provide a hinge support for the force coil 74 on the movable member 70, the fact that the force coil is located on the opposite end of the beam 70 from the pick-off element will provide in each case a significant reduction in the effect of the strain associated with the mounting of the force coil 74 thereby tending to significantly reduce bias errors in the instrument output.

Also, it should be noted that although the pick-off elements 28 are referred to a capacitive pick-off plates, the concepts described above apply equally to other types of pick-offs including electromagnetic and optical pick-off systems.

As illustrated in the various embodiments of the invention in FIGS. 2-8, a variety of different hinge arrangements can be used for attaching the movable member to the support member and for attaching the force restoring element to the movable member including flexures, torsional members and pivot pin arrangements.

I claim:

1. A force balancing assembly for use in a force sensitive instrument comprising;
   a support member;
   a force sensing movable member
   means including at least one first hinge element for mounting said force sensing movable member on said support member
   a force restoring element; and
   means including at least one hinge element for mounting said force restoring element on said movable member wherein said means is effective to permit movement of said force restoring element with respect to said movable member.

2. The assembly of claim 1 wherein said support member and said movable member are substantially circular in configuration 3. The assembly of claim 1 wherein said force restoring element mounting means is secured to the opposite side of said movable member from said first hinge element.

4. The assembly of claim 1 wherein said movable member acts in conjunction with at least one pick-off element and wherein said force restoring element mounting means is aligned with an axis of the centroid of said pick-off element.

5. The assembly of claims 3 or 4 wherein said force restoring element mounting means hinge includes at least one flexure connecting said force restoring element to said movable member.

6. The assembly of claim 1 wherein said force restoring element mounting means hinge includes torsion members connecting said force restoring element to said movable member.

7. The force balancing assembly of claim 1 wherein said movable member is configured as a beam with said force restoring element secured to one end and a pick-off element secured to the other end.

8. The assembly of claim 1 wherein said movable member mounting means includes said first hinge elements arranged so as to permit said movable member to move linearly with respect to said support member.

9. A force balancing assembly for use in a force sensitive instrument comprising:
   a support ring;
   a force sensitive movable member including at least one capacitive pick-off plate;
   a first flexure for pendulously securing said movable member to said support ring;
   a force restoring coil; and
   a second flexure for pendulously connecting said force restoring coil to said movable member.

10. The assembly of claim 9 wherein said first flexure is connected to the opposite side of said movable member from said second flexure.

11. The assembly of claim 9 wherein said second flexure is aligned with an axis of the centroid of said pick-off plate.

12. A proof mass assembly for use in an accelerometer that includes an upper and a lower magnet structure, comprising:
   a support ring interposed between and supported by the upper and lower magnet structures;
   a substantially planar force sensitive movable member configured to fit within said support ring including at least one capacitive pick-off plate secured to said movable member wherein said movable member is configured with a generally centrally located aperture;
   at least one flexure integrally connected to said ring and said movable member, effective to mount said movable member in general planar alignment with said support ring;
   a restoring force coil and support structure configured to fit within said aperture of said movable member; and
   at least one flexure integrally connected to said coil support structure and said movable member effective to mount said force coil within said aperture and to transmit a restoring force from said coil to said movable member.

13. The assembly of claim 12 wherein said support ring, said movable member, each of said flexures and said force coil support structure are configured out of a unitary piece of fused quartz.

14. The assembly of claim 12 wherein said flexure connecting said support ring to said movable member is connected to said pick-off support member in a position substantially opposite to where said flexure connecting said force coil is connected to said movable member.

15. The assembly of claim 12 wherein said flexure connecting said force coil support structure to said movable member is located in alignment with an axis of the centroid of said pick-off plates.

16. A force balancing assembly for use in a force sensitive instrument comprising:
   a support member;
   a force responsive movable member;
   means including at least one hinge element for securing one end of said force responsive movable member to said support member;
   a force restoring element;
   means including at least one hinge element for securing said force restoring element to the other end of said movable member; and
   a pick-off element secured to said hinge end of said movable member.

17. The assembly of claim 16 wherein said movable element is a beam.

18. A force balancing assembly for use in a force sensitive instrument comprising:
   a support member;
   a force responsive movable member;
   means for securing said movable member to said support member such that said movable member is free to rotate about an axis;
   a force restoring element secured to said movable member by means of at least one hinge element on one side of said axis; and
   a pick-off element secured to said movable element on the other side of said axis.

19. The assembly of claim 18 wherein said movable element is a beam and said securing means includes an axle secured to said beam along said axis.

20. The assembly of claim 19 wherein said securing means includes a pivot arrangement.

21. The assembly of claim 19 wherein said securing means includes a flexure securing each end of said axle to said support member.

22. The assembly of claim 19 wherein said securing means includes a torsional member securing each end of said axle to said support member.

* * * * *